United States Patent [19]

Blum

[11] Patent Number: 4,604,746
[45] Date of Patent: Aug. 5, 1986

[54] TESTING AND DIAGNOSTIC DEVICE FOR DIGITAL COMPUTERS

[75] Inventor: Arnold Blum, Gechingen, Fed. Rep. of Germany

[73] Assignee: International Business Machines Corporation, Armonk, N.Y.

[21] Appl. No.: 602,108

[22] Filed: Apr. 19, 1984

[30] Foreign Application Priority Data

May 25, 1983 [EP] European Pat. Off. ........ 83105172.7

[51] Int. Cl.$^4$ ............................................. G06F 11/22
[52] U.S. Cl. ........................................ 371/25; 371/18
[58] Field of Search ................... 324/73 R, 73 AT; 371/21, 18, 25, 16

[56] References Cited

U.S. PATENT DOCUMENTS

| | | | |
|---|---|---|---|
| 4,369,511 | 1/1983 | Kimura | 371/25 |
| 4,412,327 | 10/1983 | Fox | 371/25 |
| 4,429,389 | 1/1984 | Catiller | 371/21 |
| 4,456,995 | 6/1984 | Ryan | 371/21 |
| 4,460,997 | 7/1984 | Schmidt | 371/21 |
| 4,460,999 | 7/1984 | Schmidt | 371/21 |
| 4,464,747 | 8/1984 | Groudan | 371/21 |
| 4,464,750 | 8/1984 | Tatematsu | 371/21 |
| 4,481,627 | 11/1984 | Beauchesne | 371/25 |
| 4,498,172 | 2/1985 | Bhavsar | 371/25 |
| 4,534,028 | 8/1985 | Trischler | 371/25 |

Primary Examiner—Michael R. Fleming
Attorney, Agent, or Firm—J. Michael Anglin

[57] ABSTRACT

For error testing and diagnostics in EDP systems, particular storage elements (e.g., 6) are connected to form an addressable matrix which is coupled to a maintenance and service processor (5) or an external tester through the system bus (9). During normal operation, the logic subsystems (10), of which processors (1) and processing units consist, are connected by the storage elements. Through the system bus, the maintenance and service processor or the tester transfers addresses to the matrix and test data to the addressed storage elements from where they are fed to the logic subsystems which in turn respond to such test data, transferring the (partial) result data thus received to the storage elements. In the next step, the maintenance and service processor or the external tester causes the result data for error analysis and diagnostics to be fetched through the system bus from the storage elements reconnected in the form of a matrix.

8 Claims, 9 Drawing Figures

FIG. 2
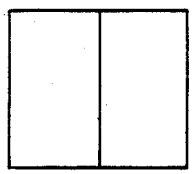
FIG. 2A   FIG. 2B
FIG. 3
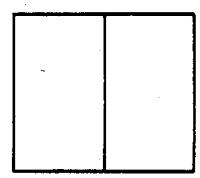
FIG. 3A   FIG. 3B
PRIOR ART
FIG. 4
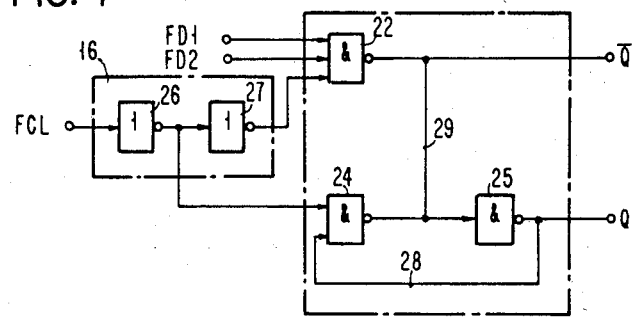
FIG. 5
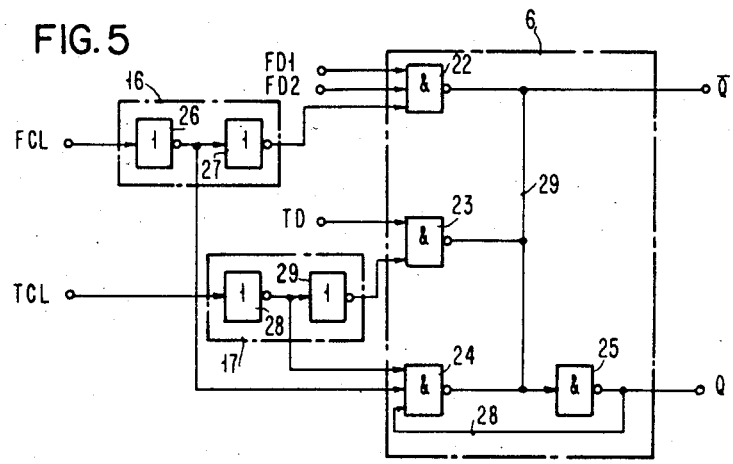

TESTING AND DIAGNOSTIC DEVICE FOR DIGITAL COMPUTERS

BACKGROUND OF THE INVENTION

The invention concerns an error testing and diagnostic device for an electronic data processing system comprising at least one processor, one main storage and one maintenance and service processor interconnected by a fast system bus.

The testing of very large scale integrated logic and storage circuits on chips, of which electronic controls, processors and data processing systems consist, is based to a considerable degree on the accessibility (observability, controllability) of the totality of the storage elements (bistable switches, flip-flops) on the chip.

Therefore, up-to-date logic structures and system architecture frequently use what is known as LSSD rules (LSSD=Level Sensitive Scan Design), according to which, for example, a logic subsystem is level sensitive if, and only if, the response to an input signal change in the steady state is independent of circuit and line delays in the logic subsystem (cf. "A Logic Design Structure for LSI Testability" by E. B. Eichelberger - Proceedings of the Design Automation Conference No. 14, 20–22 June 1977, New Orleans, La., pp. 462 to 468).

Based on these LSSD rules, the totality of the storage elements are made observable and controllable in that the master/slave flip-flops, which are logic components and which are also positioned between the logic stages, are interconnected in the test mode as one shift register chain or several such chains. These chains are used to shift test patterns into the innards of the logic and to shift out result patterns.

The shift register chains may also be used to shift complete flip-flop or register status information into or out of complex logic groups, such as chips or modules, which are separated from each other with regard to their packaging. This shift register approach has the advantage that only relatively few input/output terminals are required and that there is a high degree of flexibility between the various packaging levels if all first packaging level shift register chains are connected to a common second packaging level shift register chain, etc., without adversely affecting the logic design in the chip.

Owing to the serial information transfer for performing tests by shifting in test patterns and shifting out result patterns, this shift register concept is highly time-consuming in the test mode. Its multi-channel feature makes this concept also relatively susceptible to noise and quite expensive, as the shift register stages consist of master/slave flip-flops, whose slave flip-flops are not required during normal operation. As a result of this disadvantage, the logic density on the chip is less than it could be if only master flip-flops were used.

SUMMARY OF THE INVENTION

Therefore, it is the object of the invention to provide a testable logic structure, whose operation is extremely fast, reliable and cheap also in the test mode and which furthermore improves the logic density on the chip.

The invention places a service processor on a high-speed bus with a central processor having logic and storage circuits. The bus normally carries system data, but can also carry test patterns, results, and addresses in a test mode. In the test mode, the service processor addresses specific central-processor storage elements, sends test patterns to them, and receives and analyzes results from the addressed storage elements.

Thus the invention has the advantage that in the test mode the test patterns and result data are transferred on the very fast system bus from a maintenance processor or tester to the logic structures to be tested, and that the result data are transferred back to the maintenance processor or tester on the same bus.

Since the invention permits producing the shift register stages as master flip-flops handling important functions both during normal operation and in the test mode, the costs involved are less and the density of the circuit structures on the chip is improved, because there are no slave flip-flops.

One way of carrying out the invention will be described in detail below with reference to drawings which illustrate only one specific embodiment.

BRIEF DESCRIPTION OF THE DRAWING

FIG. 4 is the block diagram of a known storage element (flip-flop).

FIG. 5 is the block diagram of a storage element modified for the purpose of the invention.

DESCRIPTION OF THE PREFERRED EMBODIMENT

Figure 1:
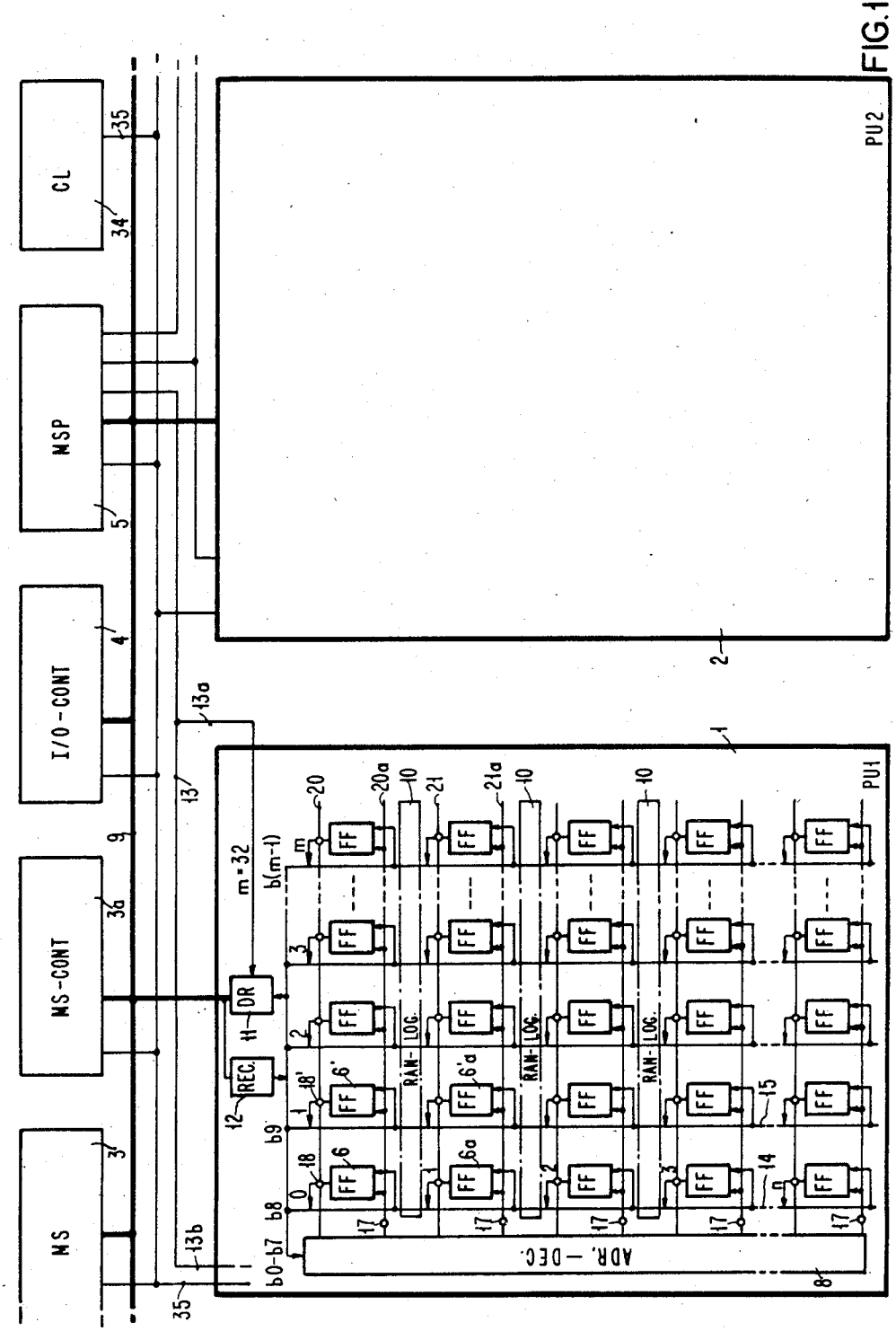
FIG. 1 block diagram of a digital computer, depicting the error-testing and diagnostic device in a processor.

FIG. 1 is the block diagram of a modular data processing system comprising single-chip processors or processing units (PU1, PU2) 1 and 2 which through a (standardized) system bus 9 are connected to each other and to a main storage (MS) 3, a main storage control unit (MS-CONT) 3a, an input/output device control (I/0-CONT) 4, and a maintenance and service processor (MSP) 5. In addition, there is a connecting line 13 between the processors 1 and 2 on the one hand and the maintenance and service processor 5 on the other, which is used to transfer control and clock signals from the maintenance and service processor 5 to the processors 1 and 2, and a line 35 on which the clock signals of a clock generator (CL) 34 are transferred to the system components.

The invention will be described below with reference to the processor 1 designed according to very large scale integration principles. For the present embodiment, the system bus 9, which may be, for example, a standardized bus, is assumed to have a width of 4 bytes. In processor 1, both the driver circuits (DR) 11 and the receiver circuits (REC) 12 are adapted to this width.

The storage elements 6, 6', 6a, 6'a, mostly so-called polarity hold flip-flops (FF), are interconnected to form logic subsystems (RAN-LOG) 10, as shown in FIG. 1. They constitute the combinational logic of the processor. The structure of this combinational logic is relatively unsystematical as far as its interconnection is concerned and differs considerably from the "overlay" structure of the m.n matrix shown in FIG. 1. This m.n flip-flop storage matrix is the result of a further overlay metallization which after personalization represents the connection between said flip-flops and the driver and receiver circuits 11 and 12 of the system bus 9 on the one hand and an address decoder (ADR-DEC) 8 on the other.

As will be described later on, this flip-flop storage matrix is used by the superordinated maintenance and service processor 5 for the purpose of testing the logic subsystems. As previously pointed out with regard to the flip-flops, they are exclusively master flip-flops rather than master/slave flip-flops which are employed for most test jobs.

The column lines, of which the first two, counting from the left, are designated as 14 and 15, are connected to the bit lines 8 to 31 of the system bus 9 through driver and receiver circuits 11 and 12, whereas the row lines, of which the top-most four designated as 20, 20a, 21 and 21a, are connected to the associated outputs of the address decoder 8 of the matrix. The address decoder is connected to the bit lines 0 to 7 through the so-called driver and receiver circuits 11 and 12 of the system bus 9. The respective direction in which the data traffic proceeds is controlled through a control line 13 leading from the maintenance and service processor 5 to the respective processors 1, 2, etc.

During the normal operation of the processor 1, the illustrated flip-flops act only as components of the logic subsystems and their connecting lines, respectively. In the test mode, the fast system bus 9 of the maintenance and service processor 5 loads these subsystems row-by-row and in parallel with the test pattern that acts as a stimulus on them. The response of the logic subsystems to the test data thus entered is transferred through the driver circuits 11 and the system bus 9 to the maintenance and service processor which performs the test analysis.

For the clock control of the data processing system shown in FIG. 1 it is irrelevant in principle whether it is effected centrally or decentrally. In the present example, it is assumed that there is a central clock generator (CL) 34 which controls the individual units 1, 2, 3, 3a, 4 and 5 of the data processing system through a central clock line 35.

After this more general description, the test data transfer from the maintenance and service processor 5 to the processors, in particular to processor 1, will be described in greater detail with reference to FIG. 2. The test data transfer to the remaining processors 2, 3, . . . , n and the handling of the test data and results are essentially effected in the same manner as that described in connection with processor 1.

FIGS. 4 and 5 serve to render the control processes on the flip-flops, for example, 6, 6', 6a and 6'a, more readily understandable. These flip-flops form part of the normal logic on the one hand and of the test logic on the other. In the latter case, it is necessary to control their direction of transfer, depending upon whether they receive or emit test data after a test step. As shown in FIGS. 4 and 5, the employed flip-flops, acting as buffer elements, are of the polarity hold type. FIG. 4 shows one such flip-flop with two functional data inputs FD1 and FD2, whereas FIG. 5 shows a polarity hold flip-flop modified for test purposes and comprising an additional test data input TD and a test clock input TCL. The normal and the extended polarity hold flip-flops are provided with a functional clock amplifier 16 for distributing the functional clock FCL, the extended polarity hold flip-flop being provided with an additional clock amplifier 17 for distributing the test clock TCL.

The conventional polarity hold flip-flop shown in FIG. 4 consists of three NAND circuits (AND inverters) 22, 24 and 25 which are interconnected in the illustrated manner.

Polarity hold flip-flops store the binary value applied to the functional data inputs FD1 or FD2 during the pulse of the functional clock FCL for the duration of one clock period. This means that the stored binary value may be changed at the earliest upon the occurrence of the next clock pulse but only if the binary value at the data input has changed by that time.

The clock pulse is supplied through two series-connected inverters 26 and 27 of the NAND circuit 22, to which also the binary data are applied. The same clock pulse reaches the NAND circuit 24 slightly earlier, as it passes only through the first inverter 26.

As with most other flip-flop types, the actual storage function of the polarity hold flip-flop is derived from the feedback line 28 between the output of the NAND circuit 25 and an input of the NAND circuit 24 to which no clock signals are applied. Line 29 between the output of the NAND circuit 22 and the output of the NAND circuit 24, which is also connected to the input of the NAND circuit 25, is a line causing the output signals of the two NAND circuits 22 and 24 to be ORed (dot-ORed). As shown in FIG. 5, this OR line 29 also permits the polarity hold flip-flop to be extended by connecting further data lines and controlling clock lines. Therefore, the polarity hold flip-flop illustrated in FIG. 5 may be shared by two systems, by the functional system with the data inputs FD1 and FD2 and the associated functional clock FCL on the one hand and by the test system with the test data input TD and the test clock input TCL on the other.

Figure 2A:
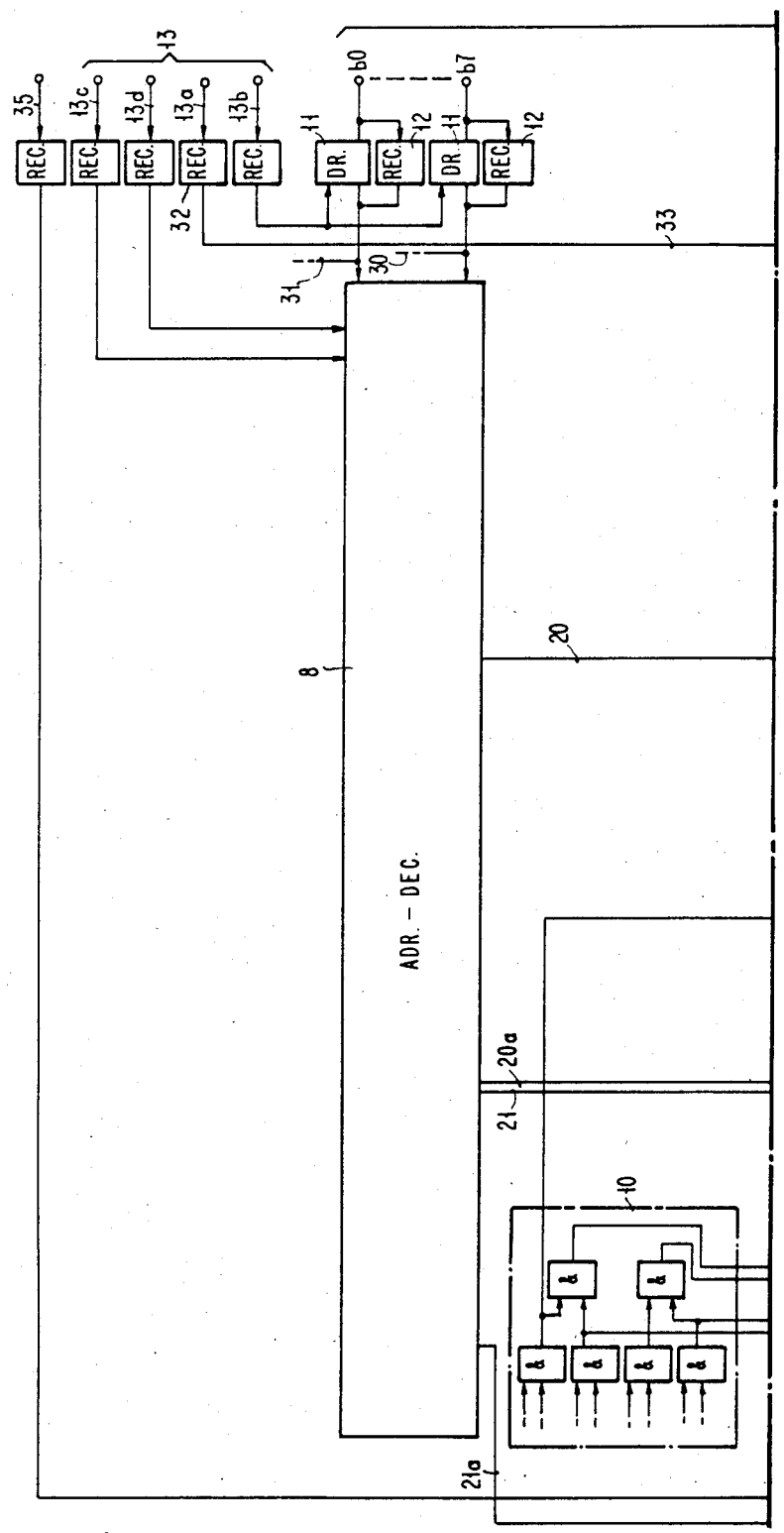
FIGS. 2A, 2B and FIGS. 3A, 3B joint as shown in FIGS. 2 and 3 respectively, are block diagrams depicting in detail the error testing and diagnostic device.
Figure 2B:
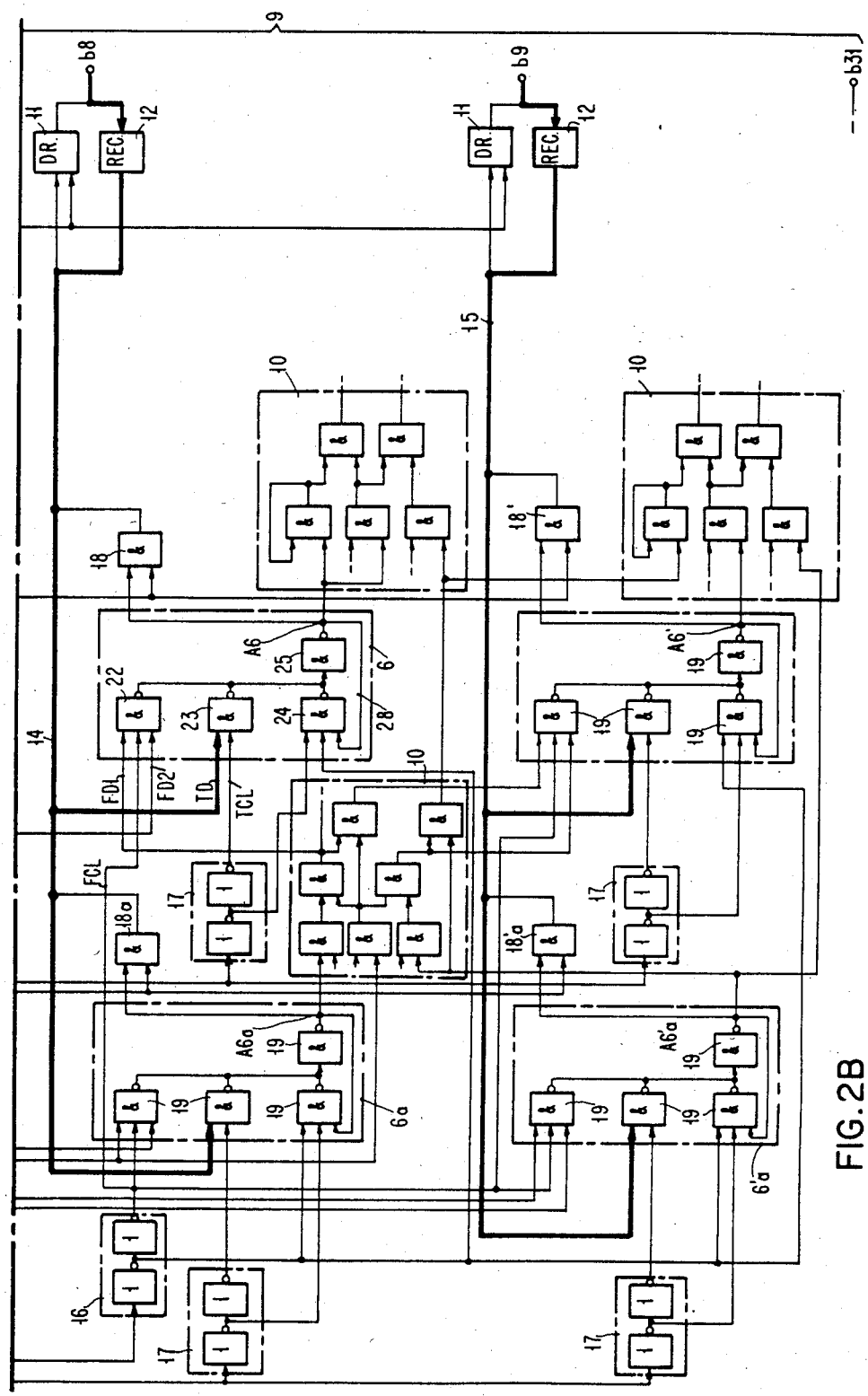
Figure 3A:
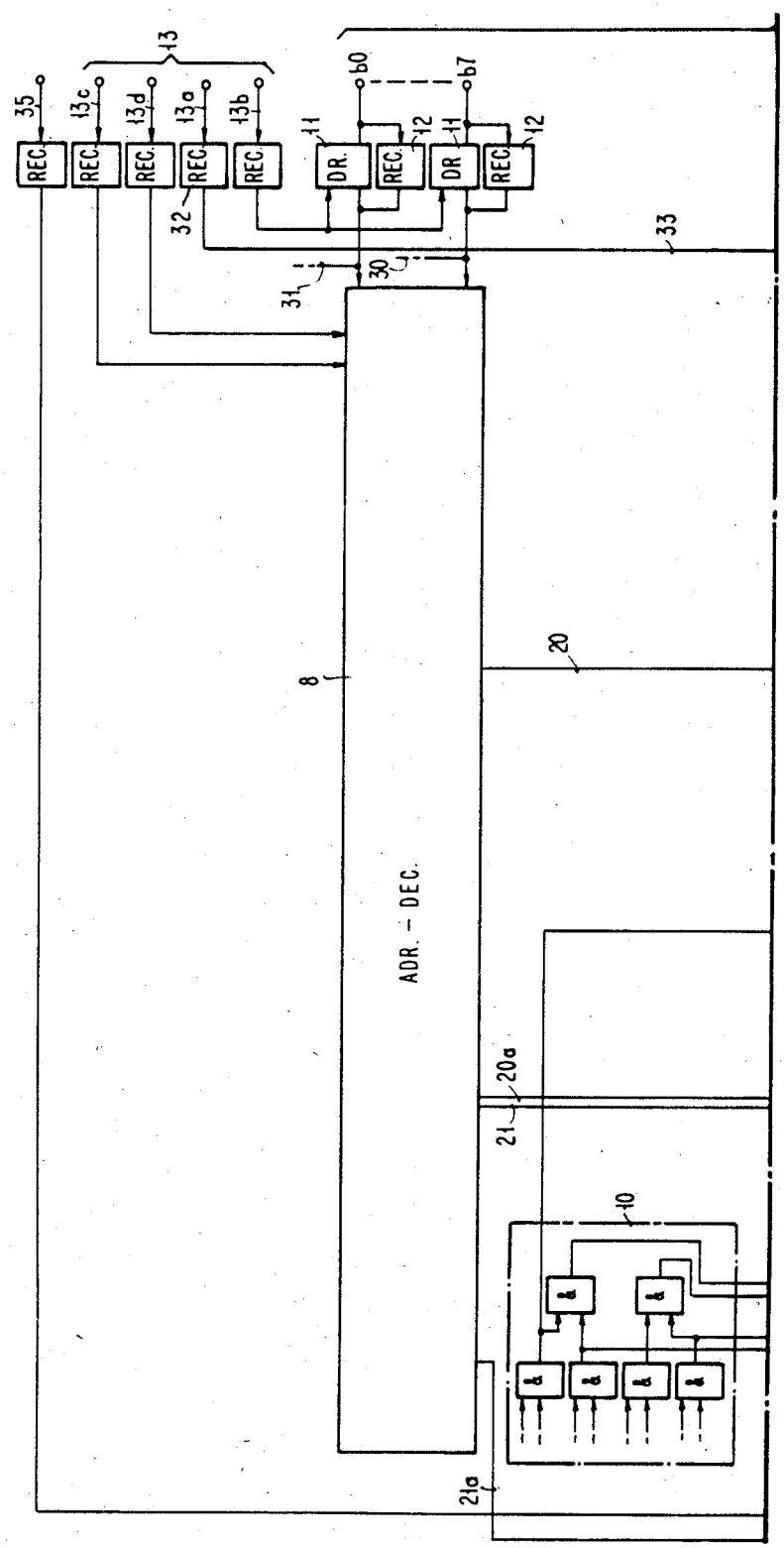
Figure 3B:
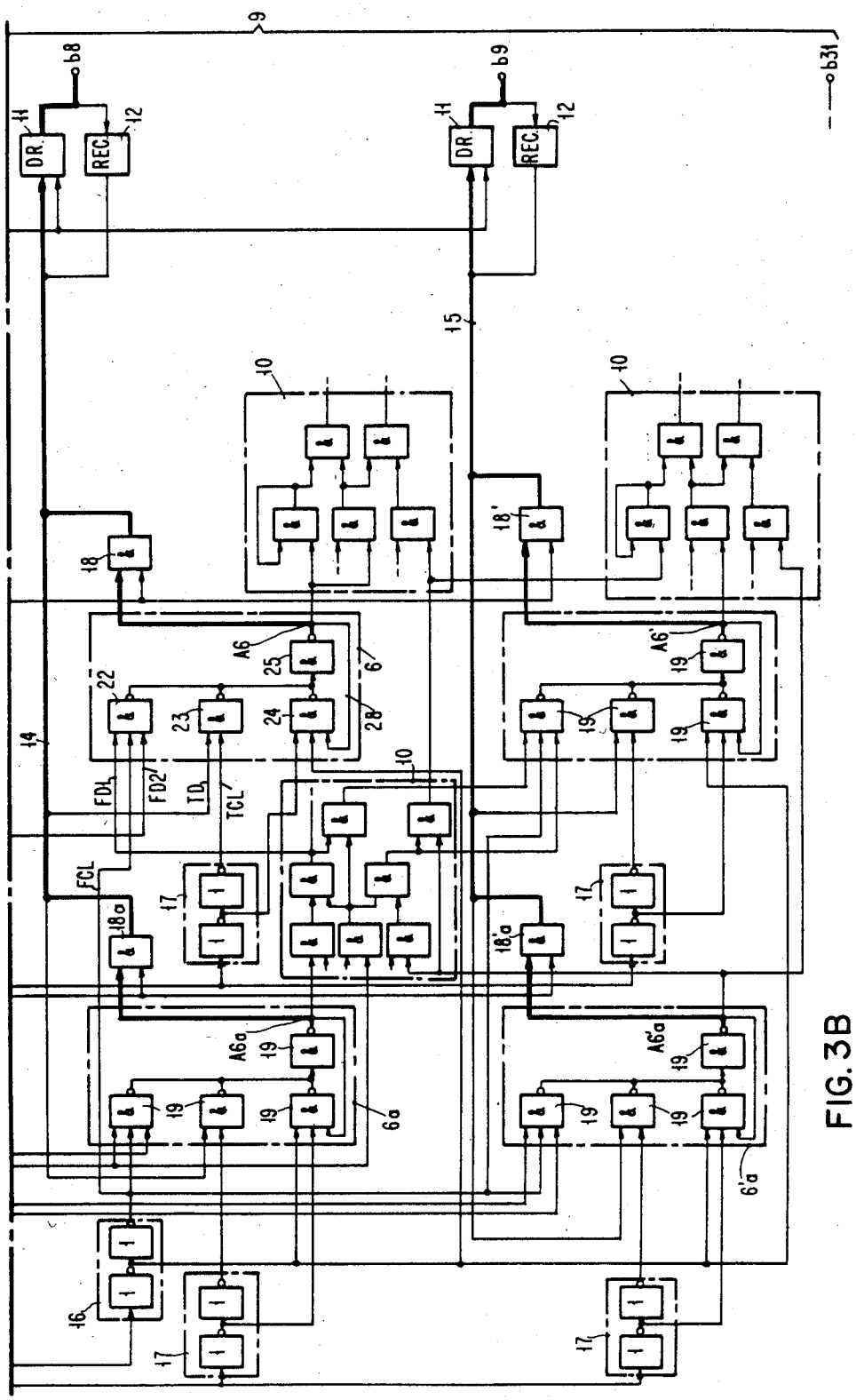

FIGS. 2 and 3 show, inter alia, the integration of the polarity hold flip-flop (FIG. 5) in the circuit structure of processor 1 as well as details of this integration for the polarity hold flip-flops 6', 6a and 6'a.

In the normal, non-test, mode, the polarity hold flip-flops FF of FIG. 1 perform their functional job through the functional data inputs FDi and their functional clock inputs FCL, whereas in the test mode, they use the test data inputs TD and the test clock inputs TCL for test jobs.

For the mode of operation on which FIG. 2 is based and according to which test data are assumed to be transferred on system bus 9 from the maintenance and service processor 5 to processor 1 (heavy lines), the bit lines b0 to b7 of the system bus are connected to the matrix address decoder 8 through receiver circuits 12. Through its matrix row lines, of which 20a and 21a are shown in greater detail, matrix address decoder 8 addresses the polarity hold flip-flop matrix in the desired direction. This addressing in the row direction, which for completely selecting a polarity hold flip-flop also includes a selected line in the column direction, as will be explained further on, is effected by applying through the respective row line and its associated test clock amplifier 17 a test clock pulse to the test clock input TCL of the polarity hold flip-flop to be selected.

The test information to be entered into the selected polarity hold flip-flop, subsequently referred to as flip-flop for simplicity, is transferred on the respective bit lines b8 to b31 of the system bus 9, through receiver circuits associated with them, to the respective column line, of which column lines 14 and 15 are shown in greater detail. Through receiver circuits 12 and bit lines b8 to b31 with which these circuits are associated, the test data are fed row-by-row and in parallel to the matrix column lines, the test data inputs of the flip-flops FF, connected to these column lines, and the storage elements comprising these flip-flops.

To continue with the example of flip-flop 6, test data may be stored in it if it is addressed in the row direction by a test clock pulse on line 20a from test clock amplifier 17, by the bit to be stored through bit line b8, and by receiver circuit 12, matrix column line 14 and test data input TD. In a similar manner, the remaining flip-flops of the test matrix are loaded with test data through the matrix row lines and the matrix column lines.

After the test data have been stored, they are transferred to the logic subsystems 10 for testing. The test results yielded by such a set of test data are subsequently loaded into the flip-flops 6, 6', 6a, 6'a, etc. of the test matrix, from where they are transferred in the opposite direction on system bus 9 to the maintenance and service processor 5 for test analysis.

The return path of the result data on system bus 9 from the processor 1 to be tested is shown by heavy lines in FIG. 3. FIG. 3 again shows only flip-flops 6, 6', 6a and 6'a in detail. Therefore, it is again assumed that information, part of a rest result, in flip-flop 6 is to be transferred to the maintenance and service processor 5 on system bus 9. For this purpose, processor 1 receives control signals from the maintenance and service processor on line 13 and address signals on bit lines b0 to b7 of the system bus. If flip-flop 6 and the further flip-flops 6' . . . , associated with the same row, are selected, the address decoder generates a selection signal on matrix row line 20, opening the associated AND gates 18, 18', etc. As a result, the information stored in flip-flop 6 and available at the output of NAND gate 25 can be transferred to driver circuit 11 through AND gate 18 and the respective part of matrix column line 14. A control signal, which is also transferred from the maintenance and service processor through line 13, a receiver circuit 32 and a control line 33, activates the driver circuit 11, so that the information available at that time reaches bit line b8 of the system 9.

In parallel with the information transferred from flip-flop 6, the information stored in flip-flop 6' and the remaining flip-flops, associated with the same matrix row line 20, is transferred to the respective bit lines b9 to b31. By transferring a control signal on line 13 and an address signal on lines b0 to b7, the remaining matrix lines 21, . . . are activated, so that also the information, the test result information, stored in the remaining flip-flops is transferred to the maintenance and service processor 5 for the purpose of error analysis.

Thus test result data can be transferred between interested units in the above-described manner, using the system bus which is generally very fast.

I claim:

1. A data-processing system comprising:
    a central processor having random logic networks interconnected by storage elements, said logic networks and said storage elements together performing data-processing operations in a normal mode;
    a main storage;
    an input/output control;
    a service processor for generating test patterns and test addresses and for receiving and analyzing test results in a test mode;
    a high-speed system bus coupled to said central processor, to said main storage, to said input/output control, and to said service processor, said but being adapted to carry system data and addresses among said central processor, said main storage, and said input/output control in said normal mode, and to carry said test patterns, addresses, and results between said central processor and said service in said test mode;
    an address decoder located in said central processor and operative in said test mode for addressing particular ones of said storage elements in accordance with said test addresses from said system bus;
    receiver means located in said central processor and operative in said test mode for writing said test patterns from said system bus into said particular storage elements addressed by said address decoder;
    driver means located in said central processor and operative in said test mode for reading the contents of said particular storage elements addressed by said address decoder to said system bus as said test results.

2. The system of claim 1, further comprising at least one additional central processor connected to said system bus and having an additional one of said address decoder, receiver means, and driver means.

3. The system of claim 1, wherein said service means is a service processor also coupled to said main storage and to said input/output controller via said system bus.

4. The system of claim 1, wherein said central processor includes:
    a plurality of row lines, each said row line being coupled to a plurality of said storage elements and to said address decoder for selecting said particular storage elements;
    a plurality of column lines, each said column line being coupled to a plurality of said storage elements and to said driver means and receiver means, so as to define a matrix of said storage elements.

5. The system of claim 4, wherein said system bus has a set of parallel lines for carrying said system data in said normal mode, each of said column lines being associated with a different one of said parallel bus lines, and wherein yet others of said parallel lines are coupled to said address decoder for activating different ones of said row lines in said test mode.

6. The system of claim 4, wherein said storage elements comprise single-stage polarity-hold flip-flops.

7. The system of claim 6, wherein each of said flip-flops includes:
    normal gating means operative in said normal mode for entering functional data from said random logic networks into said flip-flop;
    test gating means operative in said test mode for entering test data from one of said column lines into said flip-flop.

8. The system of claim 6, further comprising output gating means coupled to said address decoder and to said flip-flops, and operative in said test mode for coupling said test results from particular ones of said flip-flops to respective ones of said column lines.

* * * * *